D. W. HARLOW.
AUTOMOBILE RADIATOR LAMP.
APPLICATION FILED FEB. 5, 1912.
1,048,530. Patented Dec. 31, 1912.
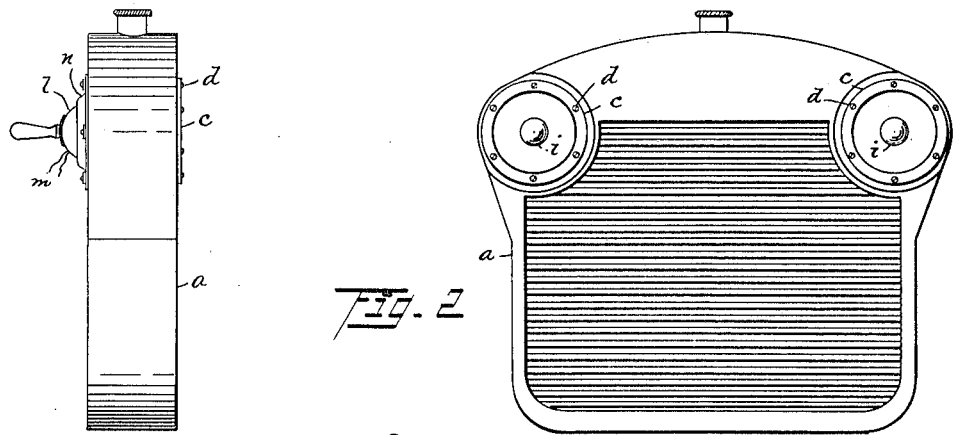
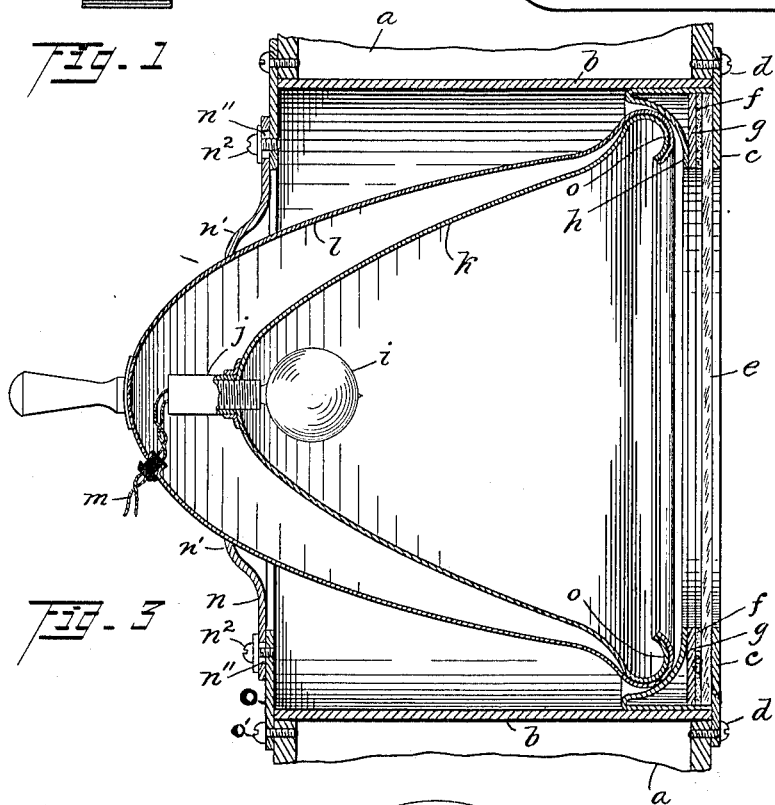
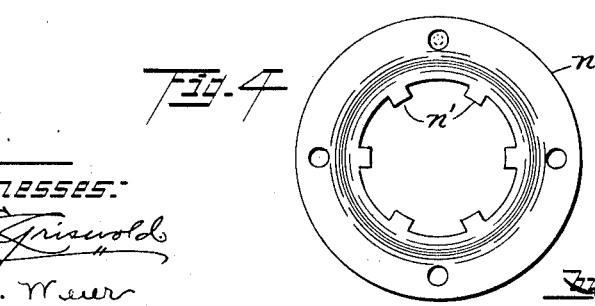

UNITED STATES PATENT OFFICE.

DON W. HARLOW, OF CLEVELAND, OHIO.

AUTOMOBILE RADIATOR-LAMP.

1,048,530.  Specification of Letters Patent.  Patented Dec. 31, 1912.

Application filed February 5, 1912. Serial No. 675,509.

*To all whom it may concern:*

Be it known that I, DON WILLIAM HARLOW, a citizen of the United States, residing at Cleveland, in the county of Cuyahoga and State of Ohio, have invented certain new and useful Improvements in Automobile Radiator-Lamps, of which the following is a specification.

My invention relates to improvements in automobile radiator-lamps, and has for its object the construction of a radiator-member, wherein the radiator-parts may be suitably accommodated and housed in connection with one or more lamps, preferably secured adjustably within the same casing as the radiator.

At the present time, automobile lamps are commonly mounted upon brackets or rods, externally supported from various portions of the automobile. Quite commonly, automobile lamps, either for convenience in adjustment or in order to secure more effective lighting, are carried by lamp-brackets positioned where they are liable to be broken or injured in driving the car. Accordingly, it has been my purpose to mount the automobile lamps in such position that they will be entirely convenient for the purposes of adjustment, renewal or other attention thereto, and will be protected from injury and dust.

The embodiment of my invention selected for illustration, contemplates the provision of two suitably sealed chambers in the upper portion of the radiator-casing, wherein the lamps, preferably of the incandescent electric type, together with their reflectors, are adjustably positioned so that they are convenient of access and suitably safeguarded, as above explained.

Further details of said structure, together with more explicit explanation as to the practice and purpose of my invention, will appear in the accompanying specification, claims and drawing; the latter comprising:—

Figure 1 which illustrates the improved radiator in side elevation, Fig. 2 showing the same in front elevation, Fig. 3 delineating a vertical section through one of the lamps and lamp-chambers upon an enlarged scale, and Fig. 4 consisting of a plan view of the supporting and adjusting ring upon a smaller scale.

Throughout the several figures, I have employed the same character of reference, to indicate similar parts.

The radiator-casing $a$ is slightly expanded or enlarged transversely in its upper portion to accommodate the cylindrical members $b$ at either side, forming the side walls of the lamp-chambers. A clamping ring $c$ held in position by the screws $d$, secures the glass $e$, felt-ring $f$ and washer $g$ against the concave rim $h$ positioned at the front of said chamber.

The lamp may be of any desired type; demanding suitable ventilating means, of course, if a burner be employed. However, as stated, I preferably utilize the tungsten electric incandescent lamp bulb $i$ as a source of light, which accordingly, is shown in the drawing. The lamp is screwed into its socket $j$ at the rear of the parabolic reflector $k$, which is carried within its casing $l$, through which the conductors $m$ are insulatedly inserted. At the rear of the radiator-casing, there is provided a supporting and adjusting ring $n$ which has a plurality of spring-like fingers $n'$, adapted to engage the rear of the casing $l$ and hold the lamp in its positions of adjustment. The adjustments are secured by providing openings $n''$ about the periphery of the ring $n$, which are larger in diameter than the screws $n^2$ provided with washers to bear upon said ring and hold it in place.

It will be observed that the forward portions of the casing $l$ and reflector $k$ are flared and curved backwardly at $o$ with a radius which is less than that of the concave rim $h$. Accordingly, the lamp is afforded such an adjustment as may be found practicable to reflect the rays of light from the lamp in the desired direction. This adjustment, however, may be secured by other means, without necessarily departing from the invention herein disclosed. Moreover, the precise details of construction herein explained, may be varied in a manner commensurate with the claims, in order to secure the results as above indicated.

Since the space within the reflector-casing is encroached upon but very little in the structure just described, while the lamps are given every practicable protection and still remain in convenient position at the front of the automobile, this embodiment of my invention will be found practical and advantageous in use. Again, the lamps are not subjected to the excess of vibration, frequently observable when they are carried upon external brackets, and their effectiveness is aided by the rigid support thus provided. Said lamps being positioned within the normal lines of the structure, in addition to being much better protected, are not as liable to be struck and injured by external objects.

Accordingly, I claim as new and desire to secure by Letters Patent, the following:—

1. The combination with an automobile radiator-casing, expanded in its upper portion beyond the normal outlines of the radiator insertible therein, of transverse sleeves provided upon either side of the casing in its expanded portion, a lamp and its reflector respectively inserted within each of said sleeves and the casing adjacent to the radiator-space, and means for removably securing the lamps in position, substantially as set forth.

2. The combination with an automobile radiator and its inclosing casing, of transverse sleeves laterally positioned within said casing adjacent to the radiator, glasses substantially flush with the front of the radiator casing respectively closing said sleeves, and a lamp and its reflector inserted within each of said sleeves interiorly of the radiator casing, substantially as set forth.

3. The combination with a rigidly mounted lamp-casing, of a concave annular rim at the front thereof, a reflector provided with a convex rim engaging the former, a lamp positioned within said reflector and means for securing the adjustment of the reflector, substantially as set forth.

4. The combination with the radiator-casing $a$, of a transverse sleeve extending therethrough, a glass substantially flush with the casing closing the forward end of said sleeve, a reflector, a lamp therein and means for removably securing said lamp and reflector within the sleeve, substantially as set forth.

5. The combination with an automobile-radiator, of an inclosing chamber provided within the casing thereof closely adjacent to said radiator, a glass closing the front of said casing, a lamp and its reflector within said chamber, and means for adjustably securing the lamp in place, substantially as set forth.

6. The combination with the radiator-casing $a$, of the sleeve $b$, extending through said casing, translucent means for closing said casing at the front of the sleeve, a reflector $k$ and its protective casing adjustably mounted at the front and rear of the sleeve, and means for removably securing them in their positions of adjustment, substantially as set forth.

In testimony whereof I affix my signature in the presence of two witnesses.

DON W. HARLOW.

Witnesses:
C. A. MEIER,
ALBERT LYNN LAWRENCE.